United States Patent
Kanaya et al.

(10) Patent No.: US 6,680,459 B2
(45) Date of Patent: Jan. 20, 2004

(54) LASER BEAM MACHINING APPARATUS AND LASER BEAM MACHINING METHOD

(75) Inventors: Shuso Kanaya, Toyama (JP); Yuichi Morita, Toyama (JP)

(73) Assignee: Nippei Toyama Corporation, Tokyo (JP)

( * ) Notice: Subject to any disclaimer, the term of this patent is extended or adjusted under 35 U.S.C. 154(b) by 33 days.

(21) Appl. No.: 10/175,831

(22) Filed: Jun. 21, 2002

(65) Prior Publication Data
US 2003/0000927 A1 Jan. 2, 2003

(30) Foreign Application Priority Data

Jun. 22, 2001 (JP) .................. P.2001-189480
Sep. 20, 2001 (JP) .................. P.2001-287579

(51) Int. Cl.$^7$ ............................................. B23K 26/00
(52) U.S. Cl. .................. 219/121.7; 219/121.7; 219/121.67
(58) Field of Search ............. 219/121.7, 121.71, 219/121.67, 121.69, 121.6

(56) References Cited

U.S. PATENT DOCUMENTS

| | | |
|---|---|---|
| 4,794,222 A | 12/1988 | Funayama et al. |
| 4,959,119 A * | 9/1990 | Lantzer .................. 216/65 |

FOREIGN PATENT DOCUMENTS

| | | |
|---|---|---|
| JP | 62-156090 A | 7/1987 |
| JP | 63-108982 A | 5/1988 |
| JP | 3-268887 A | 11/1991 |
| JP | 8-19879 A | 1/1996 |
| JP | 9-220685 A | 8/1997 |
| JP | 10-85966 | 4/1998 |
| JP | 10-202386 A | 8/1998 |
| JP | 11-138286 A | 5/1999 |
| JP | 2001-38479 | 2/2001 |
| JP | 2001-300756 A | 10/2001 |
| JP | 2001-311603 A | 11/2001 |
| JP | 2002-11587 A | 1/2002 |

* cited by examiner

Primary Examiner—M. Alexandra Elve
(74) Attorney, Agent, or Firm—Sughrue Mion, PLLC

(57) ABSTRACT

A laser beam machining apparatus forms blind holes at predetermined intervals in a workpiece by intermittently irradiating a laser beam from a laser nozzle to the workpiece while the laser nozzle and the workpiece being moved relatively. During the time the workpiece is subjected to machining, the electrostatic capacity between the support member and the laser nozzle is detected by an electrostatic capacity sensor while the workpiece made of conductive material is supported on the support member. The irradiation output power is controlled by a control unit which operates to vary the number of output pulses from the laser nozzle each time one hole is formed according to the result detected in response to variation in the thickness of the workpiece.

14 Claims, 8 Drawing Sheets

LASER BEAM MACHINING APPARATUS AND LASER BEAM MACHINING METHOD

BACKGROUND OF THE INVENTION

1. Field of the Invention

The present invention relates to a laser beam machining apparatus for forming a tearable portion in a workpiece such as automotive instrument panel by irradiating a laser beam and a laser beam machining method therefor.

2. Description of the Related Art

Air bags for passenger seats of automobiles are generally placed on the inside of instrument panels. Moreover, an opening is formed in the instrument panel in a position opposite to the air bag and a cover plate is mounted over the opening; or otherwise there is formed a groove for use in cleaving a predetermined opening portion in the instrument panel though no opening is provided therein. In this case, the air bag is normally covered with the cover plate or the opening portion and when the air bag is activated, the cover plate is broken or the opening portion is cloven out of the groove so that the air bag is inflated outside the instrument panel.

With the above structure of covering the air bag, however, the problem of spoiling the external appearance arises as the outward form of the cover plate or the groove of the opening portion is exposed on the front surface of the instrument panel. A further problem is that the reflection of the outward form of the cover plate or the grooves of the opening portion on the front window also puts a restraint on driving activity.

In order to deal with the foregoing problems, there has been proposed a method of forming a tearable portion by drilling blind holes at predetermined intervals in the rear side of an instrument panel to form a line of perforations. In this method, however, it is needed to form the tearable portion having a predetermined value of breaking strength over the whole periphery while a predetermined remain thickness is secured between the bottom face of each perforation and the front surface side of the panel.

Nevertheless, because instrument panels are curved and of uneven thickness when they are produced by molding, it has been difficult to drill blind holes in the instrument panel so that the remain thickness is secured uniformly.

In order to deal with the problem above, there have heretofore been proposed laser beam machining methods as disclosed in, for example, Japanese Patent Laid-Open No. 85966/1998 (the first prior art) and Japanese Patent Laid-Open No. 2001-38479 (the second prior art).

According to the first prior art, when a tearable portion as a blind hole is drilled by the irradiation of a laser beam to a workpiece, the laser beam transmitted through the aperture is detected whereby to stop the drilling of the aperture when the power transmitted therethrough reaches a predetermined value. According to the second prior art, further, a laser beam is synthesized with a detection beam beforehand and the detection beam transmitted through an aperture is detected when the aperture is drilled by irradiating the laser beam to a workpiece whereby to stop the drilling of the aperture when the power transmitted therethrough reaches a predetermined value.

As set forth above, according to the conventional laser beam machining methods, the depth of apertures to be drilled is controlled so that the remain thickness is secured uniformly by detecting a small quantity of laser beam or detection beam transmitted through the cut part (aperture) of the workpiece. Therefore, a sensor for detecting the laser beam or the detection beam is needed to be provided on a supporting member such as a jig for supporting a workpiece to be subjected to machining and in a position corresponding to a laser nozzle in such a manner that the sensor is movable integrally with the workpiece on the opposite side of the workpiece, and this makes the detection device not only complicated in construction but also expensive. The problem in this case is that the necessity of adjusting the detection level before the workpiece is subjected to machining makes it troublesome to detect slight variation in the thickness of the workpiece. According to the first prior art, moreover, there is the possibility that as the laser beam is transmitted through the aperture of the workpiece, a small hole or a scar is bored or left in the base of the aperture in the form of a tearable portion.

Further, in order to make constant the remain thickness, the output power of the laser beam has to be stabilized. For the stabilization of the laser beam, various factors or conditions such as the voltage supplied to the oscillator of a laser beam machining apparatus, the temperature of cooling water in an optical system and the ambient temperature of the machining apparatus also have to be definite. Actually, these factors and conditions are hardly kept constant and with the change of the optical system with time, moreover, the actual output power of the laser beam tends to vary in most cases.

In case where laser beam machining is carried out while the output power of the laser beam remains variable, the remain thickness of a workpiece also varies and this may result in impeding development of cleavage when the air bag is inflated, thus making small holes or leaving scars in the workpiece because a laser beam is allowed to pass through the workpiece.

In order to compensate for the variable output power of the laser beam, there has been proposed the art described in, for example, Japanese Patent Laid-Open No. 278687/1988 (the third prior art). In this prior art, the output power of a pulsed laser beam following a reference pulse oscillated at a predetermined fundamental frequency as shown in FIG. 12 is detected pulse-to-pulse and the output power is integrated by an integration circuit. Then the integrated value is compared with a reference value whereby to decide the error therebetween.

However, though discharge time is required for the integration circuit when the output of the pulsed laser beam is integrated, the discharge time is difficult to secure because the output OFF time of the pulsed laser beam oscillated at a high speed of 5 KHz, for example, is too short.

Therefore, it is conceivable to shorten the time constant of the integration circuit but as is obvious from an integral value 30 of FIG. 12, the oscillation noise of the pulsed laser beam is detected. In case where the time constant is set longer, on the other hand, the discharge time of the integration circuit would not be secured as stated above. Consequently, a value widely different from the actual output power value is monitored and the laser output power cannot be detected accurately according to the prior art method. When the prior art method is applied to forming a tearable portion in the instrument panel, it becomes impossible to control the laser output power and this results in difficulty in making constant the remain thickness of the panel.

SUMMARY OF THE INVENTION

A first object of the invention made with a special attention directed to the foregoing problems existing in the prior art is to provide a laser beam machining apparatus for ensuring that slight variation in the thickness of a workpiece is made detectable by a detection device which is simple in construction and producible less costly and for accurately drilling perforations in a panel while the remain portion of the panel base secures the predetermined thickness, and a laser beam machining method therefor.

Further, a second object of the invention is also to provide a laser beam machining apparatus for making constant the remain thickness of a panel base by allowing the value of a laser beam by pulse oscillation to be accurately securable and a laser beam machining method therefor.

In order to accomplish the first object, according to a first aspect, there is provided a laser beam machining apparatus for forming a blind hole in a workpiece by the irradiation of a laser beam from a nozzle to a rear surface of the workpiece while moving a machining head having the nozzle and the workpiece relatively, comprising:

a workpiece support member made of conductive material for supporting and fixing the workpiece;

a distance detection unit provided in the machining head and detecting the electrostatic capacity of a distance with a surface of the workpiece support member as a reference; and a control unit controlling the laser beam in response to the electrostatic capacity which varies along with the thickness of the workpiece disposed between the workpiece support member and the distance detection unit.

Therefore, according to the first aspect of the invention, a detection device simple in construction is producible less costly contrary to the prior art in which the laser beam or detection beam transmitted through the blind hole of the workpiece is detected. Moreover, it is not only ensured to make detectable slight variation in the thickness of the workpiece but also possible to accurately form the blind hole while the predetermined remain thickness of the bottom face of the panel base is secured.

According to a second aspect of the invention, in the laser beam machining apparatus according to the first aspect, the laser output power by pulse oscillation is controlled in response to variation in the electrostatic capacity while the nozzle and the workpiece are moved relatively with a predetermined distance between the workpiece support member and the distance detection unit being made constant.

Therefore, according to the second aspect, the depth of the drilling hole can be adjusted easily and accurately by setting the number of oscillated pulses of the laser beam in response to variation in the electrostatic capacity. Further, many perforations are formable at the predetermined intervals while the predetermined remain thickness of the panel base is secured, which is fit for use in providing an opening for an air bag in an instrument panel for covering the air bag.

According to a third aspect of the invention, in the laser beam machining apparatus according to the first aspect, the distance detection unit is provided to the nozzle.

Therefore, according to the invention described in the third aspect, no special mount need not be provided for the distance detection unit, which is made simple in construction, whereby the accessibility of the nozzle to the workpiece is improved.

According to a fourth aspect of the invention, there is provided a laser beam machining method for forming a blind hole in a workpiece by irradiating a laser beam from a nozzle to a rear surface of the workpiece while moving a machining head having the nozzle and the workpiece relatively, comprising the steps of:

fixing the workpiece to a workpiece support member made of conductive material;

detecting the electrostatic capacity of a distance with a surface of the workpiece support member as a reference; and controlling the laser output power by pulse oscillation in response to the electrostatic capacity which varies along with the thickness of the workpiece disposed on the workpiece support member, so that the bottom portion of the hole has a predetermined thickness.

Therefore, the same function as what is described in the first aspect can be retained according to the invention described in the fourth aspect.

According to the fifth aspect of the invention, the laser beam machining method according to the fourth aspect, further comprises the step of:

performing a peripheral groove by oscillating pulses intermittently at predetermined intervals when the machining head and the workpiece are moved relatively.

Therefore, the same function as what is described in the second aspect can be retained according to the invention described in the fifth aspect.

According to the sixth aspect of the invention, the laser beam machining method according to the fourth aspect, further comprises the step of:

adjusting the drilling depth by controlling the laser output power in response to the number of pulses of the laser output by pulse oscillation.

Further, in order to accomplished the second object, according to a seventh aspect of the invention, there is provided a laser beam machining apparatus of irradiating a laser beam by pulse oscillation from a nozzle to a rear surface of a workpiece while moving the nozzle and the workpiece relatively, so that blind holes are lined up in the workpiece with remain portions in a front surface side of the workpiece, comprising:

a thickness detection unit detecting the thickness of the workpiece, an output power control unit controlling the output power of the laser beam in response to the result detected by the thickness detection unit so that the irradiation of the large power laser beam is switched to the irradiation of a small power laser beam after the irradiation of the large power laser beam at each perforation;

a laser beam detection unit detecting the actual output power of the laser beam when the large power laser beam is irradiated, an adder adding the output power detected by the laser beam detection unit; and an adjusting unit adjusting the output power of the small power laser beam irradiated after the irradiation of the large power laser beam to conform to a command value in response to the result added by the adder.

Therefore, according to the seventh aspect of the invention, machining blind holes with the remain portion can be formed in the workpiece for machining the tearable portion by the irradiation of the laser beam by pulse oscillation. Then the machining blind holes are continuously lined up in the form of the tearable portion along the surface of the workpiece so as to form a groove-like tearable portion. In this case, the small power laser beam by pulse oscillation is used to machine the blind holes after the large power laser beam thereby is used to machine the blind holes and the number of pulses of the small power laser beam is so adjusted as to conform to the command value in accordance with the laser beam output by the large power laser beam. Consequently, even though an error in the depth of the blind hole is made because of the large power pulsed laser beam, the error can be rectified at the time of drilling a hole by means of the small power laser beam, so that the remain thickness of the bottom face of the blind hole is uniformized. As the small power laser beam is used to drill holes after the large power laser beam is used to drill holes, the opening side of each hole is widely formed. Hence, inactive gas and swarfs of the workpiece are smoothly discharged, whereby the drilling operation can be performed precisely and efficiently. In making a decision on the laser beam output power, further, the actual output power can be accurately calculated only by adding the pulse-to-pulse power of the laser beam by pulse oscillation. On the basis of the accurate power value, the drilling depth, that is, the accurate remain thickness of the panel base can be secured. Moreover, the depth of the blind holes is made adjustable by adjusting the laser beam output power by pulse oscillation in response to the thickness of the workpiece and even though the thickness of the workpiece varies, the uniform thickness of the remain portion of the panel base can be secured.

According to an eighth aspect of the invention, in the laser beam machining apparatus according to the seventh aspect, the thickness detection unit includes an electrostatic capacity sensor provided at the front end of the nozzle.

Therefore, in comparison with a case where the laser beam transmitted through the workpiece is detected, it is ensured that the thickness of the workpiece is detectable without cause through-holes to appear in the workpiece. Moreover, the sensor is not needed to be installed on both sides of the workpiece and this makes the laser beam machining apparatus simple in construction.

According to a ninth aspect of the invention, in the laser beam machining apparatus according to the seventh aspect, the irradiation power of the small power laser beam at each drilling is set in a range between 70% or lower and 20% or higher of the irradiation power of the large power laser beam.

Therefore, in the invention described in the ninth aspect, since the small-output irradiation power is sufficiently lower than the large-output irradiation power, the depth of the blind hole is made adjustable by the small power laser beam.

According to a tenth aspect of the invention, there is provided a laser beam machining method of irradiating a laser beam by pulse oscillation from a nozzle to a rear surface of a workpiece while moving the nozzle and the workpiece relatively, so that blind holes are lined up in the workpiece with remain portions in a front surface side of the workpiece, comprising the steps of:

detecting the thickness of the workpiece;
  switching the irradiation of a large power laser beam to the irradiation of a small power laser beam after the irradiation of the large power laser beam at each perforation in response to the detected result of the thickness of the workpiece;
  detecting the actual output power of the laser beam when the large power laser beam is irradiated;
  adding the detected output power; and
  adjusting the output power of the small power laser beam irradiated after the irradiation of the large power laser beam to conform to a command value in response to the added result.

Therefore, the same effect as what is described in the seventh aspect is achievable.

According to an eleventh aspect of the invention, in the laser beam machining method according to the tenth aspect, the output power of the large power laser beam is corrected so that the output power thereof conforms to the command value in response to the added result.

Therefore, as the large power laser beam causing the drilling depth to be great is an object for correction, the depth of the holes can effectively be corrected.

According to a twelfth aspect of the invention, in the laser beam machining method according to the tenth aspect, the irradiation power of the small power leaser beam at each perforation is set in a range between 70% or lower and 20% or higher of the irradiation power of the large power laser beam.

Therefore, the same effect as what is described in the ninth aspect is achievable according to the invention described in the twelfth aspect.

DETAILED DESCRIPTION OF THE PREFERRED EMBODIMENTS

<First Embodiment>

A first embodiment of the invention will now be described with reference to the drawings.

Figure 1:
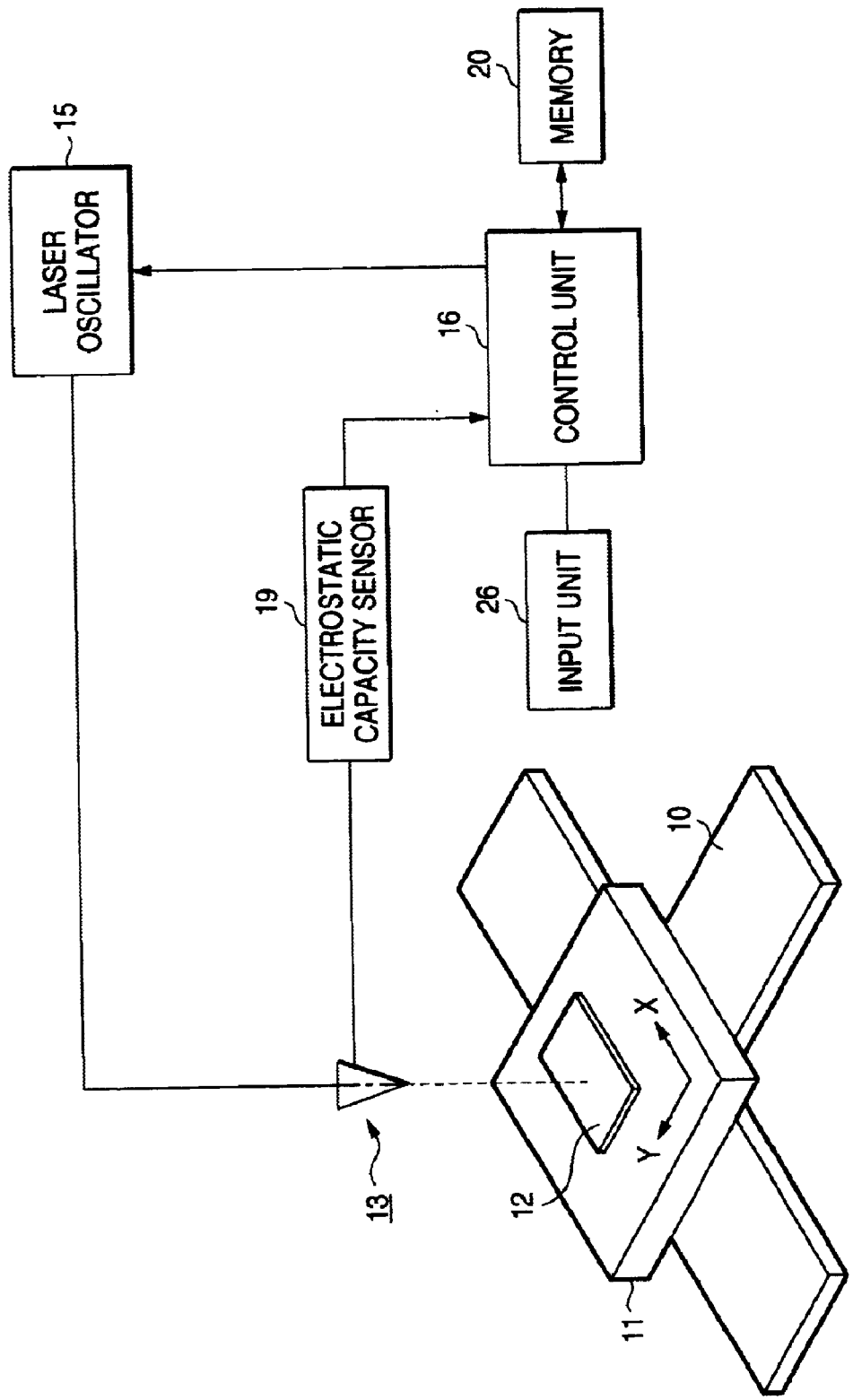
FIG. 1 is a structural view of a laser beam machining apparatus according to a first embodiment of the invention.
Figure 3:
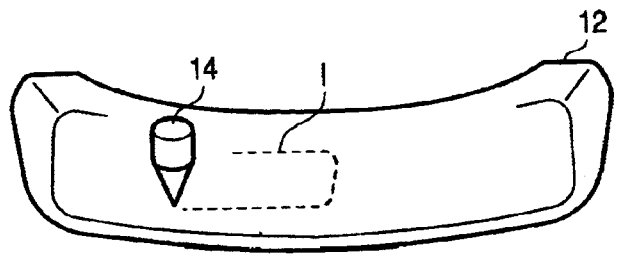
FIG. 3 is a perspective view showing a condition in which laser machining is applied to the workpiece.

In a laser beam machining apparatus as shown in FIG. 1 according to the first embodiment of the invention, a support member 11 forming a jig made of conductive material is disposed on a table 10. The support member 11 is moved by a driving mechanism (not shown) in the directions of X and Y. A workpiece 12 is disposed and fixedly supported on the upper surface of the support member 11 by air suction (not shown). According to this embodiment of the invention, the workpiece 12 is an instrument panel used for covering an air bag (not shown) for an automotive passenger seat as shown in FIG. 3.

Figure 2:
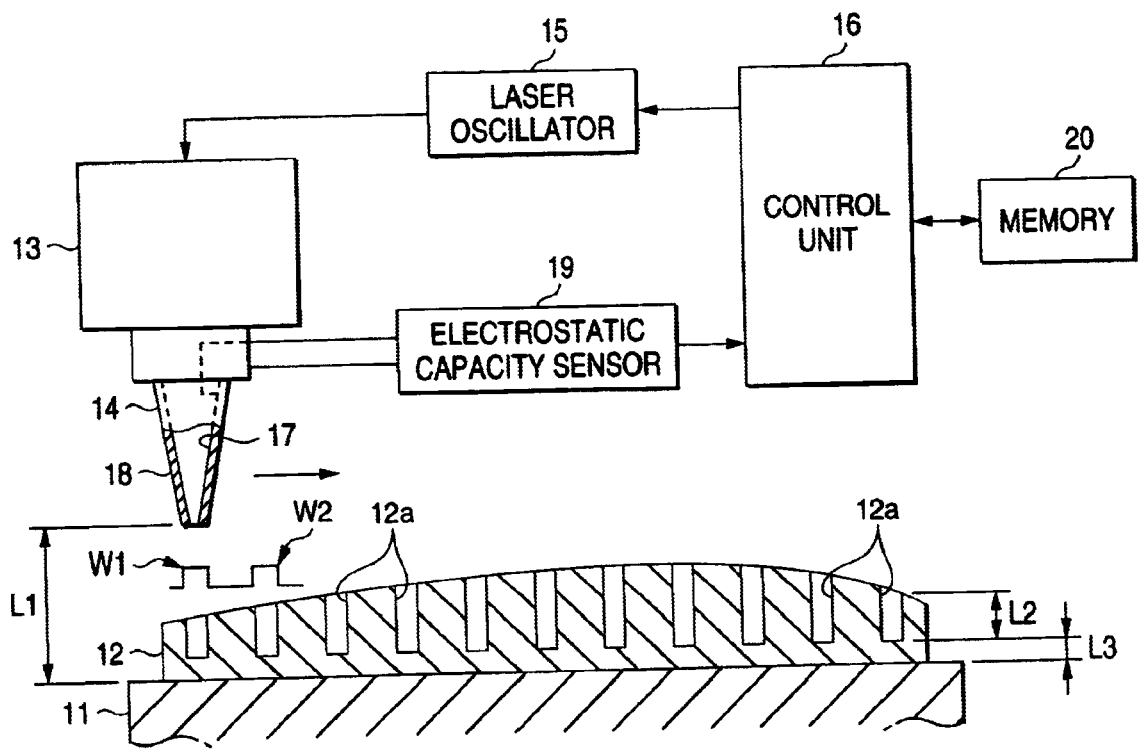
FIG. 2 is a schematic view showing the laser beam machining apparatus during the process of machining.

As shown in FIGS. 1 and 2, a laser head 13 is driven by a motor (not shown) to be disposed opposite to the support member 11 and controlled so that it is movable close to and away from the support member 11 and also tiltable with respect thereto. Moreover, a laser nozzle 14 is projected from the lower portion of the laser head 13. Further, the support member 11 and the laser head 13 including the laser nozzle 14 are moved relatively in the directions of X and Y with a predetermined vertical distance L1 held therebetween, whereby the laser nozzle 14 is moved to a predetermined perforation position on the workpiece 12.

A laser oscillator 15 is connected to the laser head 13 and a laser beam is irradiated from the laser oscillator 15 by pulse oscillation to the laser head 13 under the control of a control unit 16. Then the laser beam is guided to the laser nozzle 14 and irradiated therefrom intermittently at predetermined intervals onto the workpiece 12. According to this embodiment of the invention, it has been arranged that a number of tearable portions 12a such as blind holes are machined by the laser beam in the workpiece 12. Consequently, a peripheral groove 1 as a whole is formed on the workpiece 12 as shown in FIG. 3.

Figure 4:
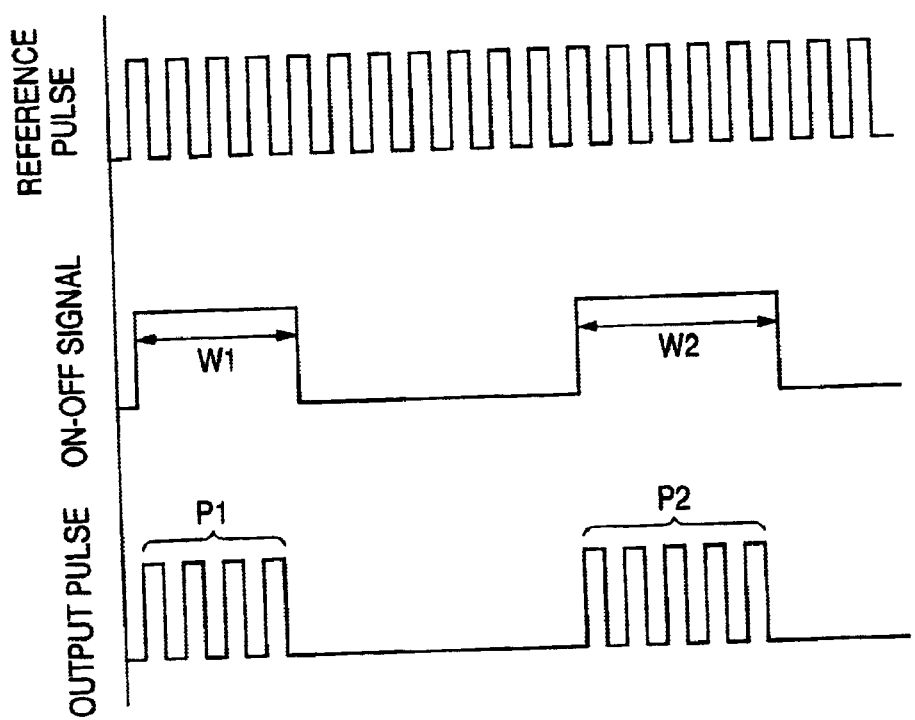
FIG. 4 is an explanatory view showing a condition in which output pulses of a laser beam are controlled according to the first embodiment.

More specifically, as shown in FIG. 4 indicating W1 and W2 of FIG. 2 in an enlarged manner, the control unit 16 oscillates and outputs a reference pulse with a predetermined frequency. And, the reference pulse is fed into the laser oscillator 15 and simultaneously on-off signals are sent from the control unit 16 to the laser oscillator 15. According to the reference pulse and the on-off signals, a laser beam having the number of pulses P1, P2 corresponding to the widths W1, W2 of the ON signal is intermittently supplied from the laser oscillator 15 to the laser head 13.

Therefore, the number of pulses P1 and that of pulses P2 are increased or decreased respectively with the widths W1 and W2 of the ON signal so as to control the laser output power. Moreover, the width of one pulse and pulse-to-pulse distance of the laser beam is dependent on the reference pulse. Since many pulses are oscillated in response to the moving rate of the laser nozzle 14 by setting the output pulse frequency at as high as 5,000 Hz, for example, each of the widths W1 and W2 of the ON signal acts as what is used to drill one hole. Thus, the tearable portions 12a having depths L2 each corresponding to the number of output pulses P1 and P2 are formed by the laser beam in the workpiece 12.

Figure 5:
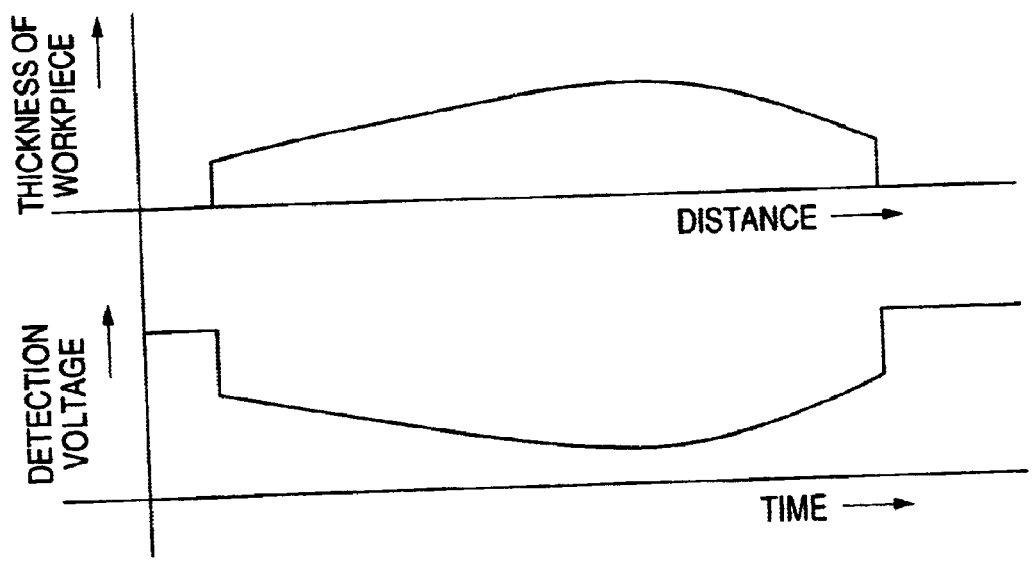
FIG. 5 is a characteristic view showing detection voltage of electrostatic capacity corresponding to the thickness of a workpiece.

The base of the laser nozzle 14 is formed of insulating material and a first electrode 17 is formed on the inner peripheral face of the nozzle 14 by coating or the like, whereas a second electrode 18 is similarly formed on the outer peripheral face thereof by coating or the like. An electrostatic capacity sensor 19 as a detecting unit is connected to the first electrode 17 and the second electrode 18. When each blind hole 12a of the workpiece 12 is formed, the electrostatic capacity sensor 19 detects the electrostatic capacity between the support member 11 and the laser nozzle 14 and the detected result is fed into the control unit 16. Although an electrostatic capacity sensor has heretofore been utilized for measuring the distance quantity between metallic materials, a non-metallic material has also been held between the metallic materials in order to clarify the variation of the electrostatic capacity therebetween from the thickness of non-metallic material. In other words, as shown in FIG. 5, a detection voltage is obtained based on the electrostatic capacity corresponding to variation in the thickness of the workpiece 12.

An input unit 26 such as an input panel of FIG. 1 is intended to manually input various kinds of data and commands.

A memory 20 is connected to the control unit 16 and stored with various kinds of data for use in controlling the laser oscillator 15 by means of the control unit 16. More specifically, the memory 20 stores, in the form of a table, for example, machining position data for the plurality of blind holes 12a to be formed in the workpiece 12, relative data on the detection voltage of the electrostatic capacity, the widths W1 and W2 of the ON signal out of the on-off signals and the number of output pulses P1 and P2. When the control unit 16 receives the detected result of the electrostatic capacity from the electrostatic capacity sensor 19 at the time each blind hole 12a of the workpiece 12 is formed by laser beam machining, the control unit 16 sets the widths W1 and W2 of the ON signal out of the on-off signals directed to the laser oscillator 15 according to the relative data stored in the memory 20. With this setting, the number of pulses P1 and that of pulses P2 of the laser beam supplied from the laser oscillator 15 is changed, whereby the irradiation output power of the laser beam is so controlled as to be increased or decreased.

As the thickness of the workpiece 12 in the machining position decreases, voltage of large electrostatic capacity is detected. On the basis of the detection voltage, the widths W1 and W2 of the ON signal out of the on-off signals are set small and this results in outputting a laser beam having a smaller number of pulses P1, P2, so that blind holes 12a having a smaller depth L2 are formed. As the thickness of the workpiece 12 in the machining position increases, on the contrary, the detection voltage of a small electrostatic capacity is produced. On the basis of the detection voltage, the widths W1 and W2 of the ON signal out of the on-off signals are set large and this results in outputting a laser beam having a greater number of pulses P1 or P2, so that blind holes 12a having a greater depth L2 are formed. In other words, the drilling depth L2 is adjusted by increasing or decreasing the number of pulses. Consequently, even though the thickness of the workpiece 12 varies, desired depth can be set to each blind hole 12a, whereby it is possible to secure the uniform remain thickness L3 of the panel base in the workpiece.

Further, program data shown by a flowchart of FIG. 6, as will be described below, is stored in the memory 20.

The operation of a laser beam machining apparatus as mentioned above will now be described by reference to the flowchart of FIG. 6. The program stored in the memory 20 is conducted under the control of the control unit 16 as shown in the flowchart of FIG. 6.

When the laser beam machining is started in the laser beam machining apparatus, the laser nozzle 14 is moved to a programmed position above the workpiece 12 on the support member 11 and disposed in such a condition that a predetermined distance L1 is provided therebetween (Step S1). Therefore, the distance between the laser nozzle 14 and the support member 11 is kept having a specified value.

In this condition, the laser head 13 including the laser nozzle 14 and the support member 11 used to support the workpiece 12 are moved relatively, so that the laser beam machining of the workpiece 12 is started as shown in FIG. 3 (Step S2). In this case, the electrostatic capacity sensor 19 detects electrostatic capacity in a condition that the position of the laser nozzle 14 corresponds to the machining position of one blind hole 12a, and detection voltage corresponding to the thickness of the workpiece 12 is fed into the control unit 16 (Step S3).

On the basis of the detection voltage of the electrostatic capacity, the widths W1 and W2 of the ON signal out of the on-off signals directed to the laser oscillator 15 from the control unit 16 are set. Therefore, the number of pulses P1 and that of pulses P2 of the laser beam supplied from the laser oscillator 15 are set in response to the respective widths W1 and W2 of the ON signal (Step S4). Further, the laser beam having the set number of pulses P1, P2 sent from the laser oscillator 15 is irradiated from the laser nozzle 14 to the workpiece 12, whereby the blind holes 12a are formed while the predetermined remain thickness of the panel base is secured (Step S5). In this case, the greater the number of pulses P1 and that of pulses P2, the deeper the holes are formed, whereas the smaller the number of pulses P1 and that of pulses P2, the shallower the holes are formed. In case where the detected thickness of each hole 12a is great, control is performed so that the set values of the number of pulses P1 and that of pulses P2 increases, whereas in case where the detected thickness thereof is small, control is performed so that the set values of the number of pulses P1 and that of pulses P2 decreases. Consequently, the remain thickness L3 of the panel base in the workpiece 12 is kept constant.

Upon termination of formation of each blind hole 12a in the workpiece 12, whether or not the presence of the next blind hole 12a in the machining position data is decided (Step S6). In making this decision, Step S3 is followed again when the next blind hole 12a exists and the operation at Steps S3 to S6 is repeated whereby to form a plurality of blind holes 12a in the workpiece 12 with the predetermined remain thickness L3 being secured at the predetermined intervals. When the next blind hole 12a is absent in the machining position data, the laser-beam operation with respect to one workpiece 12 is terminated (Step S7).

Therefore, the following effect is obtained according to this embodiment of the invention.

In this laser beam machining apparatus, the workpiece 12 is fixedly supported on the support member 11 made of conductive material when the tearable portions 12a are formed at the predetermined intervals in the workpiece 12 by irradiating the laser beam from the laser nozzle 14 thereto. In this condition, the electrostatic capacity sensor 19 detects the electrostatic capacity between the support member 11 and the laser nozzle 14. On the basis of the detected results, the control unit 16 performs controlling of the radiation output power of the laser beam from the laser nozzle 14 so that the laser output power thereof is varied each time one blind hole 12a is formed.

Accordingly, the provision of the detector on the side of the support member 11 can be dispensed with contrary to the prior art in which the laser beam or detection beam transmitted through the tearable portion 12a of the workpiece 12 is detected, whereby a detection device simple in construction is producible less costly. Moreover, it is not only ensured to make detectable slight variation in the thickness of the workpiece 12 but also possible to accurately form tearable portions in a panel while the predetermined remain thickness L3 is secured. Moreover, any scar is never left in the workpiece 12 since no transmitted light for detection is needed to be generated.

In this laser beam machining apparatus, the irradiation output power of the laser beam controlled by the control unit 16 depends on the number of pulses P1 or P2. In other words, since the number of pulses P1 and that of pulses P2 of the laser beam are variably set according to the detected results of electrostatic capacity, the tearable portions 12a can accurately be formed with the predetermined remain thickness L3 being secured.

In this laser beam machining apparatus, a panel for covering an automotive air bag has been referred to as the workpiece 12. Therefore, the external appearance is restrained from being spoiled when the tearable portions 12a are formed at the predetermined intervals in the rear of the panel used to cover the air bag because small holes or scars are left in the surface side of the panel. Thus, a high-quality panel can be provided.

<Modified Examples of the First Embodiment>

The following modification can be made to the first embodiment of the invention.

According to the first embodiment of the invention, the number of output pulses P1 or P2 as the irradiation output power of the laser beam controlled by the control unit 16 is set changeable. On the other hand, the output power or output frequency of a laser beam as the irradiation output power of the laser beam is set changeable instead of the number of output pulses.

According to the first embodiment of the invention, moreover, the workpiece 12 subjected to the laser beam machining is an instrument panel for covering the air bag of an automobile. On the other hand, the invention is applied to forming grooves in a panel for covering an air bag to be incorporated in a steering wheel or any industrial material other than an instrument panel free from machining scars left in its surface.

According to the first embodiment of the invention, machining position data on the plurality of blind holes 12a, relative data on the detection voltage of the electrostatic capacity, the widths W1 and W2 of the ON signal out of the on-off signals and the number of output pulses P1 and P2 are stored in the form of a table. Further, these items of data are sequentially read out whereby to set the number of output pulses intended for each blind hole 12a. On the other hand, instead of this, the number of output pulses for each blind hole 12a is arranged so that it is computed in accordance with the level of the detection voltage of the electrostatic capacity.

According to the first embodiment of the invention, the laser beam has been irradiated intermittently to the workpiece so as to secure panel strength. However, a peripheral groove is formed by irradiating a laser beam continuously depending on the machining purpose.

The same effect as what is achievable according to the first embodiment of the invention is also obtainable even when the arrangements as stated above are additionally made.

<Second Embodiment>

A second embodiment of the invention will now be described with reference to the drawings.

Figure 7:
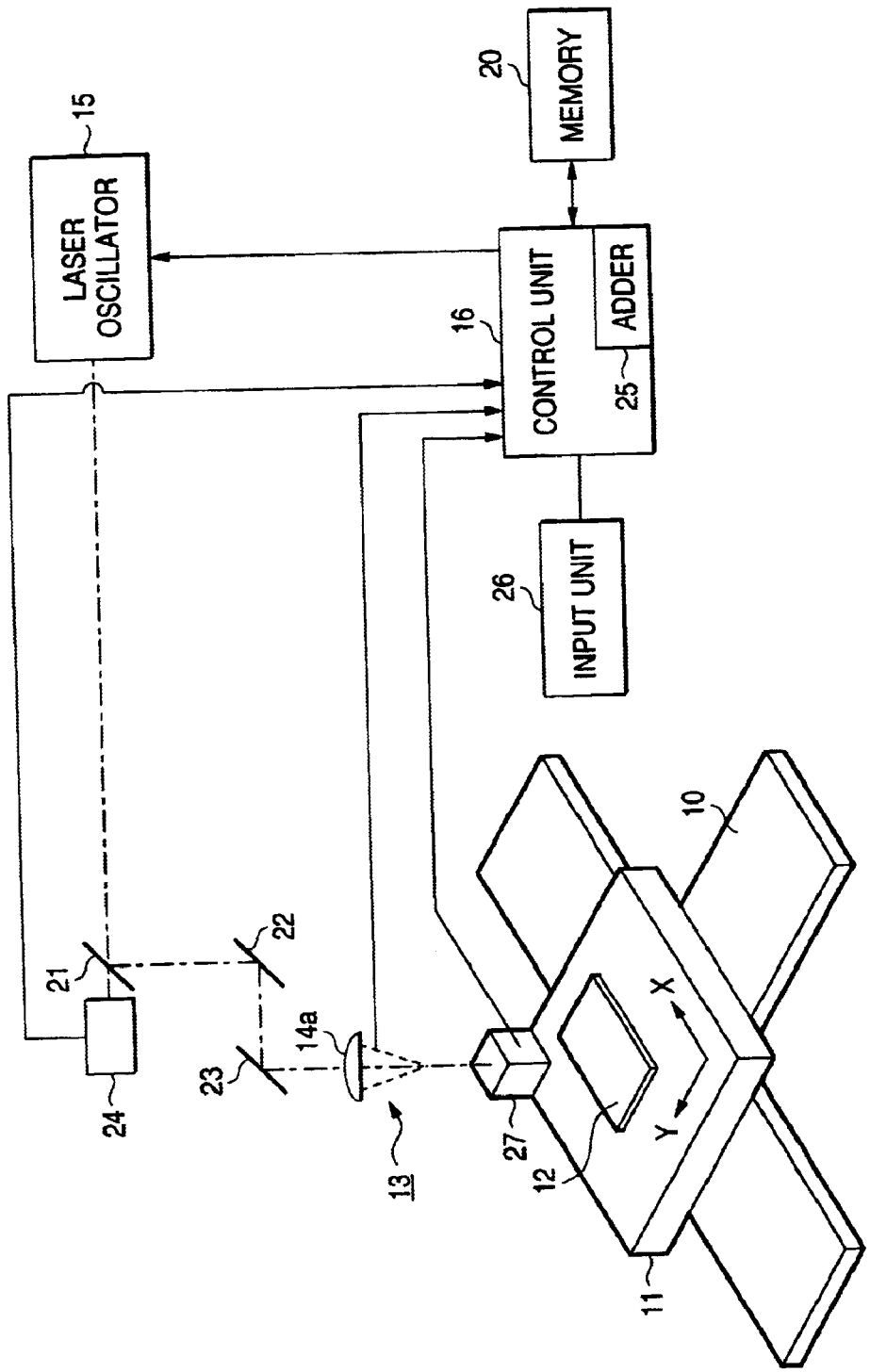
FIG. 7 is a structural view of a laser beam machining apparatus according to a second embodiment of the invention.

FIG. 7 shows a laser beam machining apparatus according to the second embodiment. Since respective constructions of a support member 11 forming a jig and a laser head 13 are substantially identical with those of the first embodiment, these detailed descriptions are omitted in this embodiment. Further, a workpiece 12 to be machined is an instrument panel shown in FIGS. 2 and 3 as well as the first embodiment.

As shown in FIG. 7, a laser oscillator 15 is connected to the laser head 13. A plurality of mirrors 21 to 23 and a focusing lens 14a are disposed between the laser oscillator 15 and the laser nozzle 14, so that a laser beam path is formed between the laser head 13 and the laser oscillator 15. One of the mirrors 21 to 23 is used as a half mirror 21 and part of the laser beam is passed through the half mirror. A detection sensor 24 as a laser beam detection unit is disposed on an optical transmission path and the actual output power of a laser beam by pulse oscillation from the laser oscillator 15 is detected.

Figure 8:
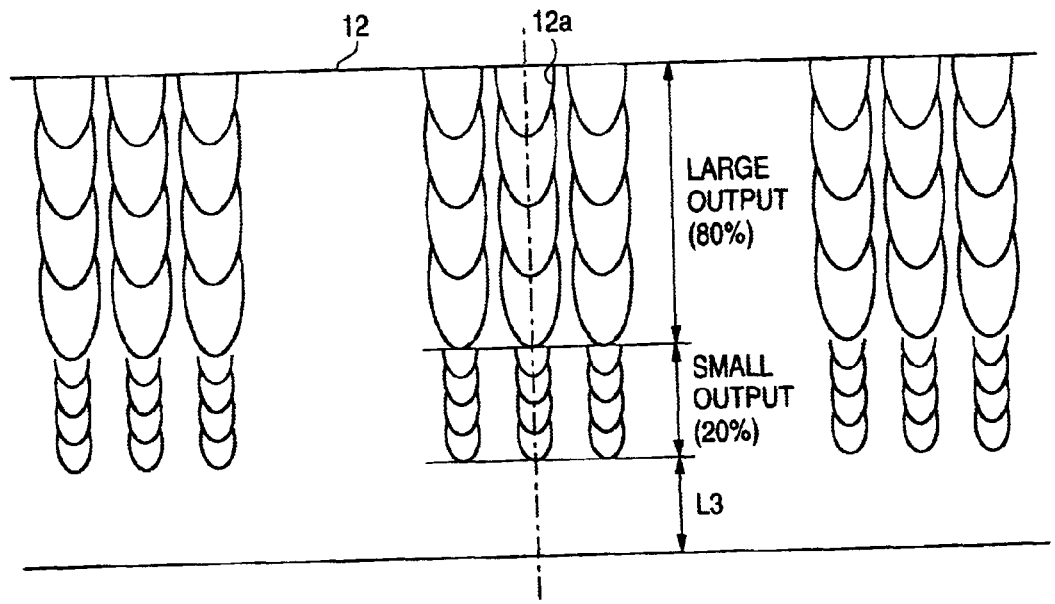
FIG. 8 is an explanatory view showing a condition in which blind holes are machined according to the second embodiment.

The laser oscillator 15 is electrically connected to a control unit 16. The control unit 16 controls the operation of the whole laser beam machining apparatus, to say nothing of the laser oscillator 15. A memory 20 is connected to the control unit 16 and stored with various kinds of data and programs. The control unit 16 and the memory 20 form a correction unit, an adjusting unit and an output power control unit. Under the control of the control unit 16 according to the various kinds of data and programs stored in the memory 20, the laser beam is supplied from the laser oscillator 15 to the laser head 13 and irradiated to the workpiece 12. Accordingly, blind holes 12a are formed by the laser beam so that the workpiece 12 has a predetermined remain thickness L3 as shown in FIG. 8. When the laser head 13 and the workpiece 12 are moved relatively in the directions of X and Y, a plurality of blind holes 12a are continuously formed along the surface of the workpiece 12 and by forming the continuous cut parts intermittently, a tearable portion in the form of perforations is formed in the workpiece 12.

Figure 9:
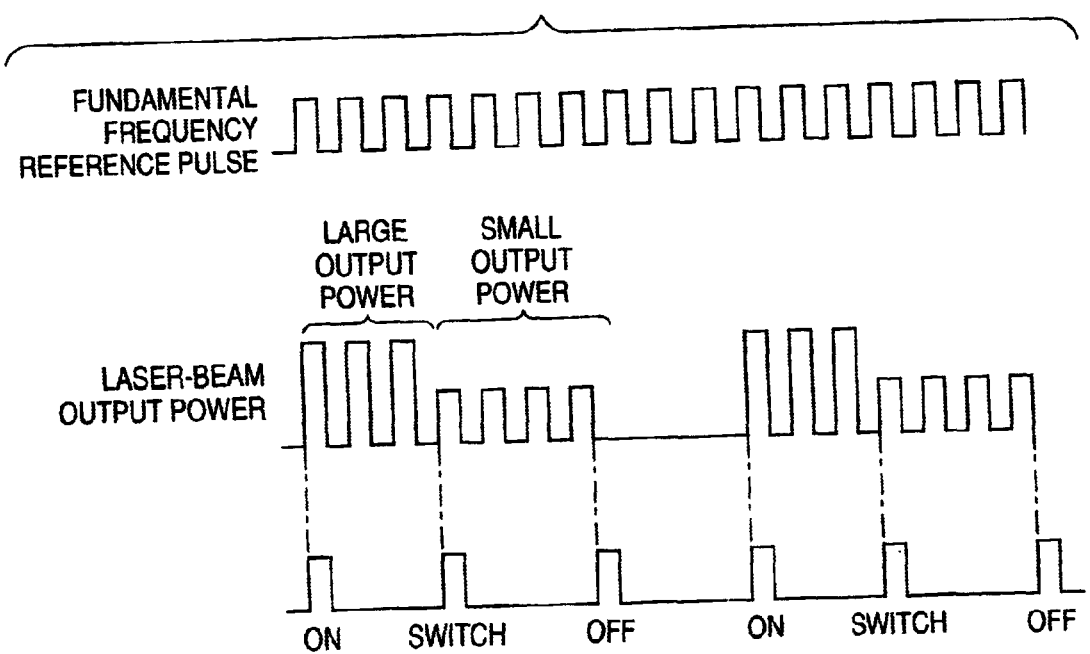
FIG. 9 is a diagram illustrating a signal for driving a laser beam by pulse oscillation according to the second embodiment.

More specifically, as shown in FIG. 9, a reference pulse having a fundamental frequency of (e.g., 5 KHz), an ON signal, an OFF signal and a switching signal are supplied from the control unit 16 to the laser oscillator 15. When the ON signal is output, the laser oscillator 15 oscillates a continuous pulsed large power beam in accordance with the reference pulse. When the switching signal is output, the oscillated laser beam is switched to the small power laser beam at a predetermined ratio to the large power laser beam. According to this embodiment of the invention, the small-output power is 50% of the large-output power. When the OFF signal is output, the laser beam output by small-output pulse oscillation is stopped. The number of pulses of the large power laser beam and that of the small power laser beam are set beforehand. However, the number of pulses of the large power laser beam and that of the small power laser beam are, as will be described later, set or changed differently under the control of the control unit 16.

The laser beam detection sensor 24 is used to detect the output power of the large power laser beam. Further, the control unit 16 computes drilling depth per pulse of the large power laser beam according to the detected output power of the large power laser beam.

On the other hand, the control unit 16 is provided with an adder 25, into which the output power of a large power laser beam detected by the detection sensor 24 is added, and the added value is stored in the memory 20. Further, the control unit 16 adjusts the output timing of the OFF signal according to the result of the output added by the adder 25. Consequently, the output value of a small power laser beam following the output power of the large power laser beam is corrected by adjusting the output timing of the OFF signal. According to this embodiment of the invention, the output value of the small power laser beam includes at least one of the pulse frequency of the laser beam, peak power of each pulsed laser beam and the number of pulses.

Figure 6:
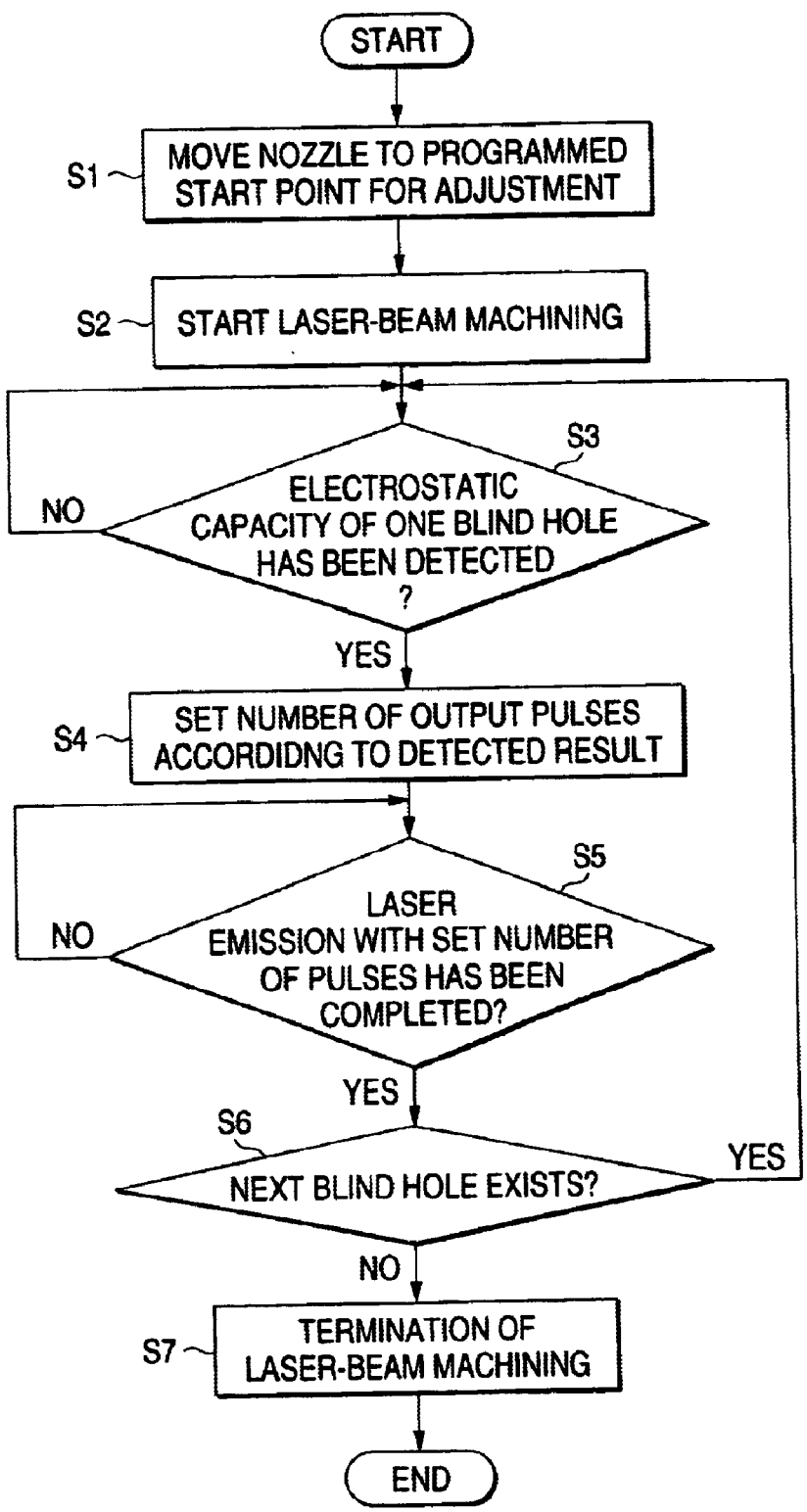
FIG. 6 is a flowchart showing the operation of the laser beam machining apparatus of FIG. 1.

As well as the first embodiment, the control unit 16 adjusts the output timing of a switching signal based on the detected results of an electrostatic capacity sensor 19 as shown in FIG. 6. As will be described below, according to the second embodiment of the invention, the depth of about 80% of blind hole is defined by the large power laser beam, whereas the depth of the rest is defined by the small power laser beam. Consequently, the output power of the large power laser beam is set in response to the thickness of the workpiece 12. Moreover, the control unit 16 adjusts the output timing of the switching signal for use in drilling the following hole on the basis of a drilling quantity per pulse of the large power laser beam as well as the value added by the adder 25 whereby to correct the value of the following large power laser beam by pulse oscillation. According to this embodiment of the invention, the output value of the large power laser beam includes at least one of the pulse frequency of the laser beam, peak power of each pulsed laser beam and the number of pulses.

A thermoelectric power monitor 27 is disposed in one corner portion of the support member 11. The thermoelectric power monitor 27 is used to measure the intensity of the laser beam on receiving the irradiation of the laser beam before the start of machining and during the work arrangements are made. The control unit 16 receives detection signals from the thermoelectric power monitor 27 and decides the difference between the command value of intensity of the laser beam and the actual output power value of the intensity thereof. Further, the control unit 16 adjusts the output power level of the pulse-to-pulse laser beam according to the decision so that the output power level of the actual intensity becomes closer to the command value.

An input unit 26 such as an input panel of FIG. 7 is intended to manually input various kinds of data and commands.

Figure 10:
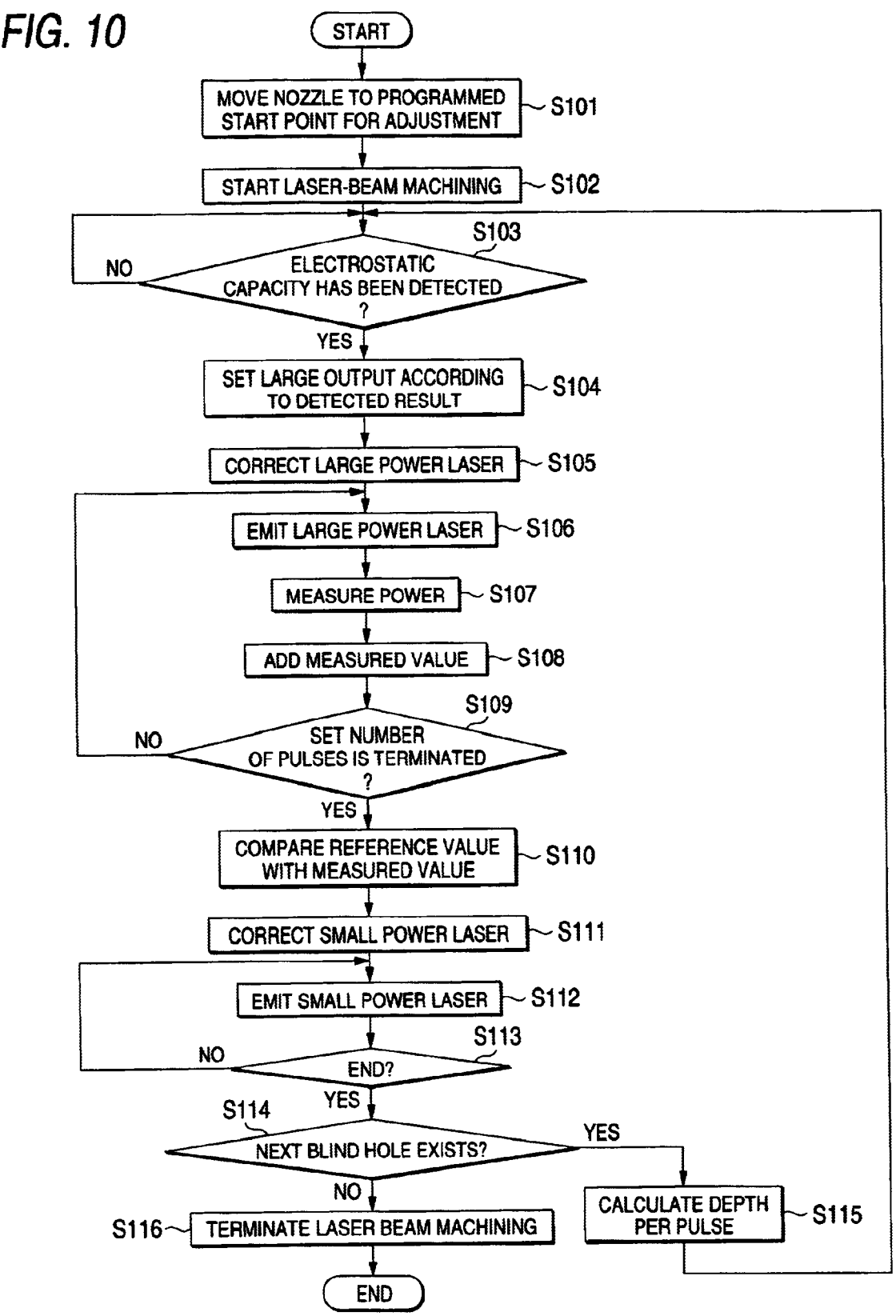
FIG. 10 is a flowchart showing the operation of the laser beam machining apparatus according to the second embodiment.

A description will now be given of a laser beam machining method through the operation of the laser beam machining apparatus thus configured according to the second embodiment of the invention by reference to a flowchart of FIG. 10. The flowchart of FIG. 10 proceeds by executing the program stored in the memory 20 under the control of the control unit 16.

When the laser beam machining is started, the laser nozzle 14 is moved to a programmed position above the workpiece 12 on the support member 11 and disposed in such a condition that a predetermined distance L1 is provided therebetween (Step S101). Therefore, the distance between the laser nozzle 14 and the support member 11 is kept having a specific value.

In this condition, the laser head 13 including the laser nozzle 14 and the support member 11 used to support the workpiece 12 are moved relatively in the directions of X and Y, so that the laser beam machining of the workpiece 12 is started (Step S102). In this case, electrostatic capacity is detected first by the electrostatic capacity sensor 19 while the position of the laser nozzle 14 corresponds to the machining position of one hole 12a and detection voltage corresponding to the thickness of the workpiece 12 is fed into the control unit 16 (Step S103).

On the basis of the detection voltage of the electrostatic capacity, the output power of the large power laser beam, that is, the number of pulses, for example, out of the output powers of the laser beam by pulse oscillation is set and corrected by the control unit 16 (Steps S104 and S105). At this time, the number of pulses of the small power laser beam is predetermined. In other words, the number of pulses of the large power laser beam is set in response to the thickness of the workpiece 12 detected by the electrostatic capacity sensor 19 so that the remain thickness L3 of the panel base becomes constant at Steps S104 and S105 as is obvious from FIG. 8. Incidentally, according to this embodiment of the invention, a drilling ratio is pre-set at standard values such that blind holes are machined by means of the large power laser beam to the extent of 80% of the drilling depth and machined by means of the small power laser beam to the extend of 20% thereof.

Figure 11:
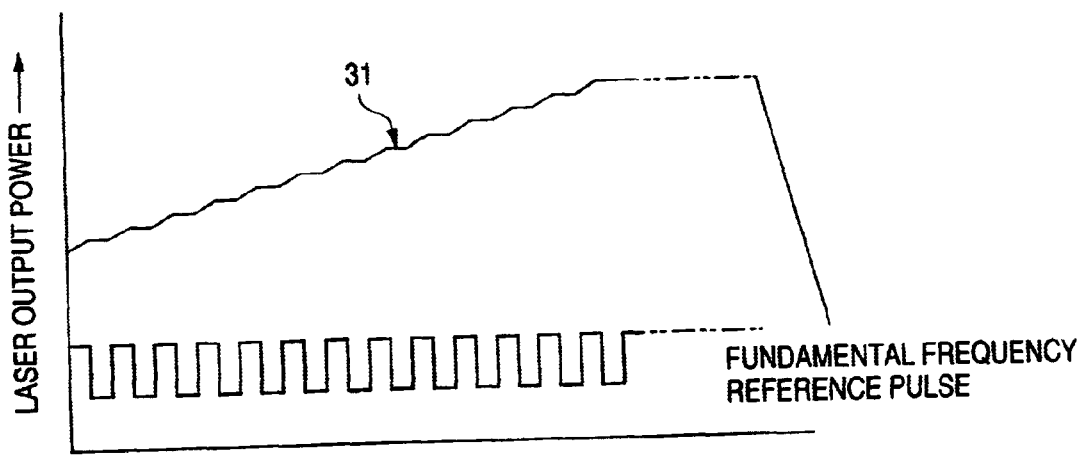
FIG. 11 is a graph showing an added value of a large power laser beam.
Figure 12:
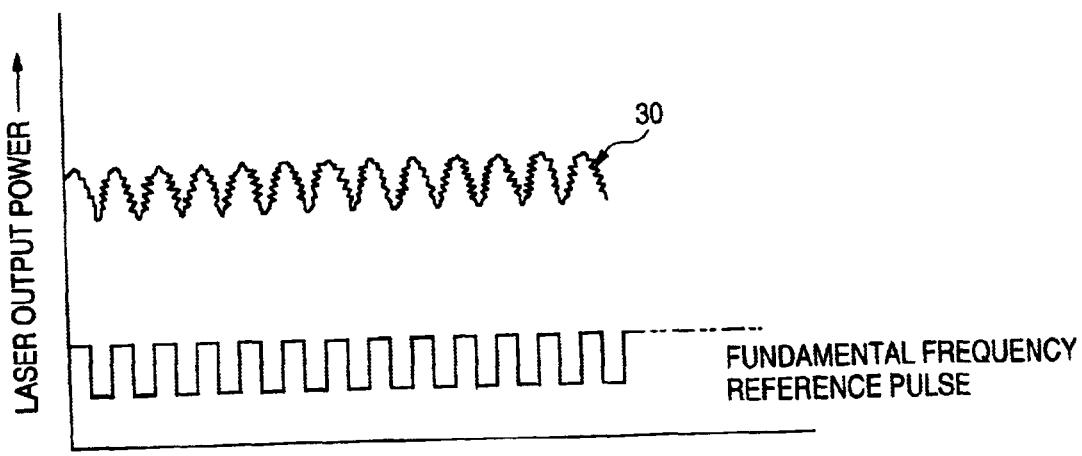
FIG. 12 is a graph showing an integrated value of a laser beam in a conventional laser beam machining apparatus.

Then the control unit 16 outputs an ON signal shown in FIG. 9 and the large power laser beam by pulse oscillation having the number of reference pulses at the fundamental frequency is irradiated to the drilling position of the workpiece 12 (Step S106) whereby to start the operating of machining a blind hole (see FIGS. 8 and 11). When the large power laser beam is irradiated, the output (power) is detected by the laser beam detection sensor 24 (Step S107) and the value of the output power thus detected is added by the adder 25 with time, a value 31 resulting from the addition is stored as shown in FIG. 11 (Step S108).

When laser machining by a set large power pulsed laser beam by pulse oscillation is thus terminated (Step S109), the total output value of the actual large power laser beam additionally computed by the adder 25 is compared with a total output power value to be obtained by the set laser beam, that is, the command value (Step S110). In case where the actual output power is found insufficient as the result of comparison, the command output of the next small power laser beam is so adjusted as to be increased with the respect to the set value, whereas in case where the actual output power is found too great, the command output is so adjusted as to be decreased (Step S111). In case where both output power values are equal, the set value is maintained without being adjusted.

Further, small power laser beam machining with the number of pulses set at Step S111 is carried out (Step S112) and when the number of pulses reaches the set number, the operation of machining a perforation 12a is terminated (Step S113). Therefore, the machining operation by means of the small power laser beam is stopped when the predetermined remain thickness L3 of the panel base is attained in the workpiece 12.

Subsequently, the presence or absence of a hole to be machined is decided (Step S114). In the absence of a hole to be machined next, the laser beam machining is stopped (Step S116). The adder 25 causes the stored charge to be discharged as shown in FIG. 11 by utilizing time upon termination of machining so as to provide for the next addition. In the presence of a hole to be machined next, the drilling depth per pulse of the large power laser beam is calculated (Step S115).

Then, the routine returns to Step S103 at which the thickness of the workpiece 12 is detected by electrostatic capacity sensor 19, so that the number of pulses by means of the large power pulsed laser beam is calculated to correspond to the thickness. At this time, the calculation of the number pulses is performed based on drilling depth per pulse calculated at Step S115. In other words, the number of pulses of the large power pulsed laser beam is calculated so that the value obtained by multiplying the drilling depth per pulse by the number of pulses corresponds to that of the drilling depth attained by the large power pulsed laser beam, and the calculated number thereof is corrected when necessary.

Then the routine at Step S103 and the following steps is implemented. As the routine is repeated, a plurality of blind holes 12a are continuously made along the surface of the workpiece 12 and the continuous portions are intermittently formed, whereby a tearable portion 1 in a desired form can be provided in the surface of the workpiece 12 as shown in FIG. 3.

Therefore, according to the second embodiment of the invention, the following effect is achievable.

The correction of the output power of the laser beam is made at the time of small power laser irradiation following the large power laser irradiation. Even though an error in the drilling depth of the hole is made because of the large power pulsed laser beam, the error can be rectified at the time of machining by means of the small power laser beam. Consequently, it is possible to accurately secure the predetermined remain thickness L3 of the panel base, whereby to form the tearable portion 1 that is surely opened under the predetermined conditions.

Since the drilling operation is carried out by means of the large power laser beam prior to the drilling operation by means of the small power laser beam, the opening side of the blind holes 12a is widely formed. Consequently, inactive gas and swarfs of the workpiece are smoothly discharged from the blind holes 12a at the time of irradiation of the laser beam, whereby the drilling operation can be performed precisely and efficiently.

As the pulse-to-pulse output power of the laser beam by the pulse oscillation is added by the adder 25, the total power value of the laser beam output by the pulse oscillation can accurately be calculated to accurately secure the drilling depth, that is, the desired remain thickness of the panel base, which is different from the case of using integration.

By detecting the thickness of the workpiece 12 so as to adjust the output power of the laser beam in response to variation in the thickness thereof, the depth of blind holes 12a is made adjustable in response to the thickness of the workpiece 12, so that the remain thickness L3 of the panel base is kept constant.

When the laser beam is adjusted in response to the thickness of the workpiece 12, the number of pulses of the laser beam given considerable deep in determining the drilling depth is made an object for adjustment by adjusting the output power of the large power laser beam. Therefore, the drilling depth by means of laser beam machining can effectively be corrected.

When the laser beam output power by the pulse oscillation is adjusted in response to the result of addition made by the adder 25, the drilling depth can finely be adjusted by adjusting the number of small power laser beams, whereby the accurate remain thickness L3 of the panel base is secured.

The laser beam output power by the pulse oscillation for the following holes is corrected in response to the result of addition made by the adder 25, whereby the constant remain thickness L3 of the panel base is secured. Thus, the uniform remain thickness of the panel base can be provided as a whole.

<Modified Examples of the Second Embodiment>

The following modification can be made to the second embodiment of the invention.

According to the second embodiment of the invention, the laser beam output power for the following drilling operation is corrected by detecting the output power of the large power laser beam. On the other hand, instead of this, the output power of the large power laser beam and the output of the small power laser beam both may be detected and reflected on the following drilling operation, whereby more accurate drilling operation can be carried out.

According to the second embodiment of the invention, the laser output power of the following large power laser beam is corrected by detecting the output power of the large power laser beam. On the other hand, instead of this, the output power of the small power laser beam may be corrected, whereby the drilling depth can finely be adjusted.

According to the second embodiment of the invention, the result detected by the electrostatic capacity sensor is reflected on the output power of the large power pulsed laser beam. On the other hand, the result detected by the electrostatic capacity sensor may be reflected on the small power pulsed laser beam.

According to the second embodiment of the invention, the irradiation power of the small power laser beam is reduced to 50% of that of the large power laser beam. On the other hand, the irradiation power of the small power laser beam may be set at any value between 70% or lower and 20% or higher.

As a detection unit for detecting the thickness of the workpiece 12, there may be used any sensor other than the electrostatic capacity sensor; for example, a sensor for mechanically detecting the thickness of a workpiece by contacting the surface of the workpiece 12, whereby cost for such a detection unit is reducible.

The invention is applied to a case where laser machining is applied any other component than an automotive instrument panel; for example, the center cover of a steering wheel. Even in this case, the same operation/working effect as what has been described in the second embodiment of the invention is achievable.

While only certain embodiments of the invention have been specifically described herein, it will apparent that numerous modifications may be made thereto without departing from the spirit and scope of the invention.

What is claimed is:

1. A laser beam machining apparatus for drilling a blind hole in a workpiece by irradiating a laser beam from a nozzle to a rear surface of the workpiece while moving a machining head having the nozzle and the workpiece relatively, comprising:
    a workpiece support member made of conductive material for supporting and fixing the workpiece;
    a distance detection unit provided in the machining head and detecting the electrostatic capacity of a distance with a surface of the workpiece support member as a reference; and
    a control unit controlling the laser beam in response to the electrostatic capacity which varies along with the thickness of the workpiece disposed between the workpiece support member and the distance detection unit.

2. The laser beam machining apparatus according to claim 1, wherein the laser output power by pulse oscillation is controlled in response to variation in the electrostatic capacity while the nozzle and the workpiece are moved relatively with a predetermined distance between the workpiece support member and the distance detection unit being made constant.

3. The laser beam machining apparatus according to claim 1, wherein the distance detection unit is provided to the nozzle.

4. The laser beam machining apparatus according to claim 3, wherein the distance detection unit includes a first electrode formed on an inner peripheral face of the nozzle made of insulating material; a second electrode formed on an outer peripheral face of the nozzle; and an electrostatic capacity sensor electrically connected to the first electrode and the second electrode.

5. A laser beam machining method for forming a blind hole in a workpiece by irradiating a laser beam from a nozzle to a rear surface of the workpiece while moving a machining head having the nozzle and the workpiece relatively, comprising the steps of:
    fixing the workpiece to a workpiece support member made of conductive material;
    detecting the electrostatic capacity of a distance with a surface of the workpiece support member as a reference; and
    controlling the laser output power by pulse oscillation in response to the electrostatic capacity which varies along with the thickness of the workpiece disposed on the workpiece support member, so that the bottom portion of the hole has a predetermined thickness.

6. The laser beam machining method according to claim 5, further comprising the step of:
    performing a peripheral groove by oscillating pulses intermittently at predetermined intervals when the machining head and the workpiece are moved relatively.

7. The laser beam machining method according to claim 5, further comprising the step of:
    adjusting the drilling depth by controlling the laser output power in response to the number of pulses of the laser output by pulse oscillation.

8. A laser beam machining apparatus of irradiating a laser beam by pulse oscillation from a nozzle to a rear surface of a workpiece while moving the nozzle and the workpiece relatively, so that blind holes are lined up in the workpiece with remain portions in a front surface side of the workpiece, comprising:
    a thickness detection unit detecting the thickness of the workpiece,
    an output power control unit controlling the output power of the laser beam in response to the result detected by the thickness detection unit so that the irradiation of the large power laser beam is switched to the irradiation of a small power laser beam after the irradiation of the large power laser beam at each drilling;
    a laser beam detection unit detecting the actual output power of the laser beam when the large power laser beam is irradiated,
    an adder adding the output power detected by the laser beam detection unit; and
    an adjusting unit adjusting the output power of the small power laser beam irradiated after the irradiation of the large power laser beam to conform to a command value in response to the result added by the adder.

9. The laser beam machining apparatus according to claim 8, wherein the thickness detection unit includes an electrostatic capacity sensor provided at the front end of the nozzle.

10. The laser beam machining apparatus according to claim 8, wherein the thickness detection unit includes a first electrode formed on an inner peripheral face of the nozzle made of insulating material; a second electrode formed on an outer peripheral face of the nozzle; and an electrostatic capacity sensor electrically connected to the first electrode and the second electrode, and the thickness of the workpiece is calculated based on the detection result obtained from the electrostatic capacity sensor.

11. The laser beam machining apparatus according to claim 8, wherein the irradiation power of the small power laser beam at each blind hole is set in a range between 70% or lower and 20% or higher of the irradiation power of the large power laser beam.

12. A laser beam machining method of irradiating a laser beam by pulse oscillation from a nozzle to a rear surface of a workpiece while moving the nozzle and the workpiece relatively, so that blind holes are lined up in the workpiece with remain portions in a front surface side of the workpiece, comprising the steps of:
    detecting the thickness of the workpiece;
    switching the irradiation of a large power laser beam to the irradiation of a small power laser beam after the irradiation of the large power laser beam at each drilling in response to the detected result of the thickness of the workpiece;

detecting the actual output power of the laser beam when the large power laser beam is irradiated;

adding the detected output power; and adjusting the output power of the small power laser beam irradiated after the irradiation of the large power laser beam to conform to a command value in response to the added result.

13. The laser beam machining method according to claim 12, wherein the output power of the large power laser beam is corrected so that the output power thereof conforms to the command value in response to the added result.

14. The laser beam machining method according to claim 12, wherein the irradiation power of the small power leaser beam at each drilling is set in a range between 70% or lower and 20% or higher of the irradiation power of the large power laser beam.

* * * * *